(12) United States Patent
Ulrich et al.

(10) Patent No.: US 10,738,819 B2
(45) Date of Patent: Aug. 11, 2020

(54) HIGH SECURITY FASTENER

(71) Applicant: McGard LLC, Orchard Park, NY (US)

(72) Inventors: Weston J. Ulrich, West Falls, NY (US); David C. Meyer, Boston, NY (US); Dustin D. Bielecki, Sloan, NY (US); Kyle M. Weis, Tonawanda, NY (US); Andrew D. Trank, Orchard Park, NY (US)

(73) Assignee: McGard LLC, Orchard Park, NY (US)

( * ) Notice: Subject to any disclaimer, the term of this patent is extended or adjusted under 35 U.S.C. 154(b) by 0 days.

(21) Appl. No.: 15/496,925

(22) Filed: Apr. 25, 2017

(65) Prior Publication Data

US 2017/0227044 A1   Aug. 10, 2017

Related U.S. Application Data

(62) Division of application No. 14/510,715, filed on Oct. 9, 2014, now Pat. No. 9,689,421.

(51) Int. Cl.
| | |
|---|---|
| *F16B 41/00* | (2006.01) |
| *F16B 23/00* | (2006.01) |
| *F16B 37/08* | (2006.01) |
| *F16B 31/02* | (2006.01) |
| *F16B 37/14* | (2006.01) |

(52) U.S. Cl.
CPC ........ *F16B 41/005* (2013.01); *F16B 23/0007* (2013.01); *F16B 23/0053* (2013.01); *F16B 23/0069* (2013.01); *F16B 37/08* (2013.01); *F16B 31/021* (2013.01); *F16B 37/14* (2013.01)

(58) Field of Classification Search
CPC . F16B 41/005; F16B 23/0007; F16B 23/0053

USPC .................................................. 411/403, 910
See application file for complete search history.

(56) References Cited

U.S. PATENT DOCUMENTS

| | | | | | |
|---|---|---|---|---|---|
| 2,140,449 | A | * | 12/1938 | Brown ................ | F16B 23/0007 411/410 |
| 2,229,565 | A | * | 1/1941 | Hallowell, Jr. ....... | C21D 9/0093 148/587 |
| 2,445,978 | A | * | 7/1948 | Stellin ................... | B25B 15/005 411/404 |

(Continued)

FOREIGN PATENT DOCUMENTS

| | | |
|---|---|---|
| EP | 1331409 A2 | 7/2003 |
| EP | 1369602 B1 | 7/2005 |

*Primary Examiner* — Flemming Saether
(74) *Attorney, Agent, or Firm* — Harter Secrest & Emery LLP

(57) ABSTRACT

A security fastener for installation on a wheel having a recess hole extending from a recess entrance of a first diameter comprising an end portion concentric with a longitudinal axis of the fastener, the end portion configured to mate with a corresponding element of the recess hole, an intermediate skirt portion having a side wall region with a diameter within about 6 millimeters of the diameter of the recess entrance, a drive portion having a tapered outer surface and a plurality of circumferentially spaced longitudinally extending key-receiving grooves in the tapered outer surface arranged in a lock pattern to which a driving torque may be applied, the tapered outer surface sloping downward and outward away from the longitudinal axis of the fastener from a top surface to the skirt portion at a taper angle of at least 11 degrees.

7 Claims, 10 Drawing Sheets

(56) References Cited

U.S. PATENT DOCUMENTS

| | | | |
|---|---|---|---|
| 3,295,572 A | | 1/1967 | Wing |
| 4,006,660 A | | 2/1977 | Yamamoto et al. |
| 4,480,513 A | * | 11/1984 | McCauley ............ F16L 23/003 |
| | | | 411/389 |
| 4,480,514 A | | 11/1984 | Ponziani |
| 4,616,535 A | | 10/1986 | Chiavon |
| 4,618,299 A | * | 10/1986 | Bainbridge ........... B25B 13/485 |
| | | | 411/374 |
| 4,648,293 A | * | 3/1987 | McCauley ............ B25B 13/485 |
| | | | 411/427 |
| 4,693,655 A | | 9/1987 | Omori |
| 5,713,705 A | | 2/1998 | Gruenbichler |
| 6,092,968 A | | 7/2000 | Lanham et al. |
| 6,619,161 B1 | | 9/2003 | Blair |
| 6,736,579 B2 | | 5/2004 | Lonnqvist et al. |
| 7,162,939 B2 | * | 1/2007 | Totsu ................... B25B 13/485 |
| | | | 411/403 |
| 7,445,414 B1 | | 11/2008 | Notaro et al. |
| 9,689,415 B2 | * | 6/2017 | Hutter, III .............. B21D 53/24 |
| 2005/0267477 A1 | | 12/2005 | Jackson |
| 2011/0044784 A1 | | 2/2011 | Da Fonseca et al. |
| 2011/0116891 A1 | | 5/2011 | Notaro et al. |

\* cited by examiner

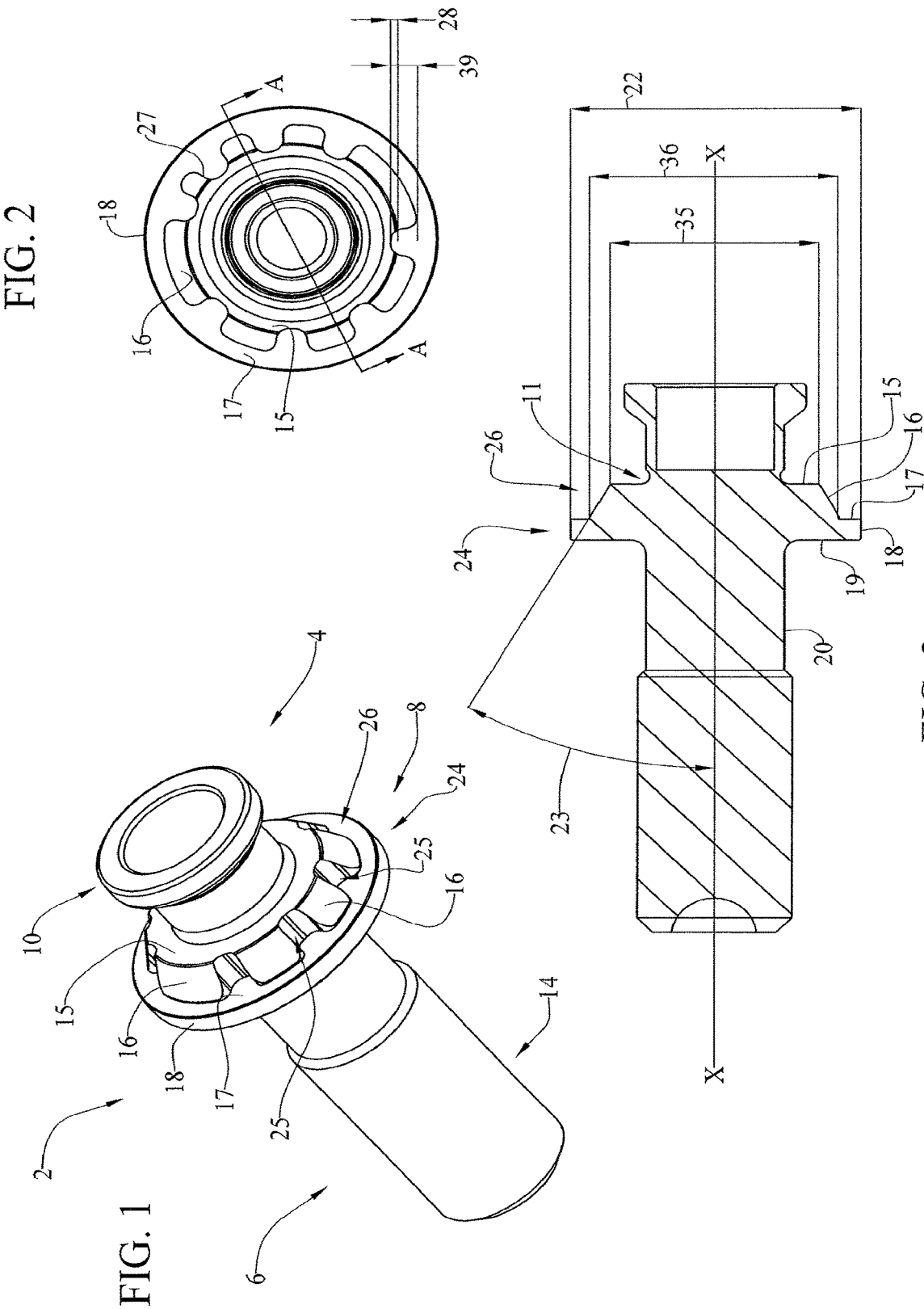

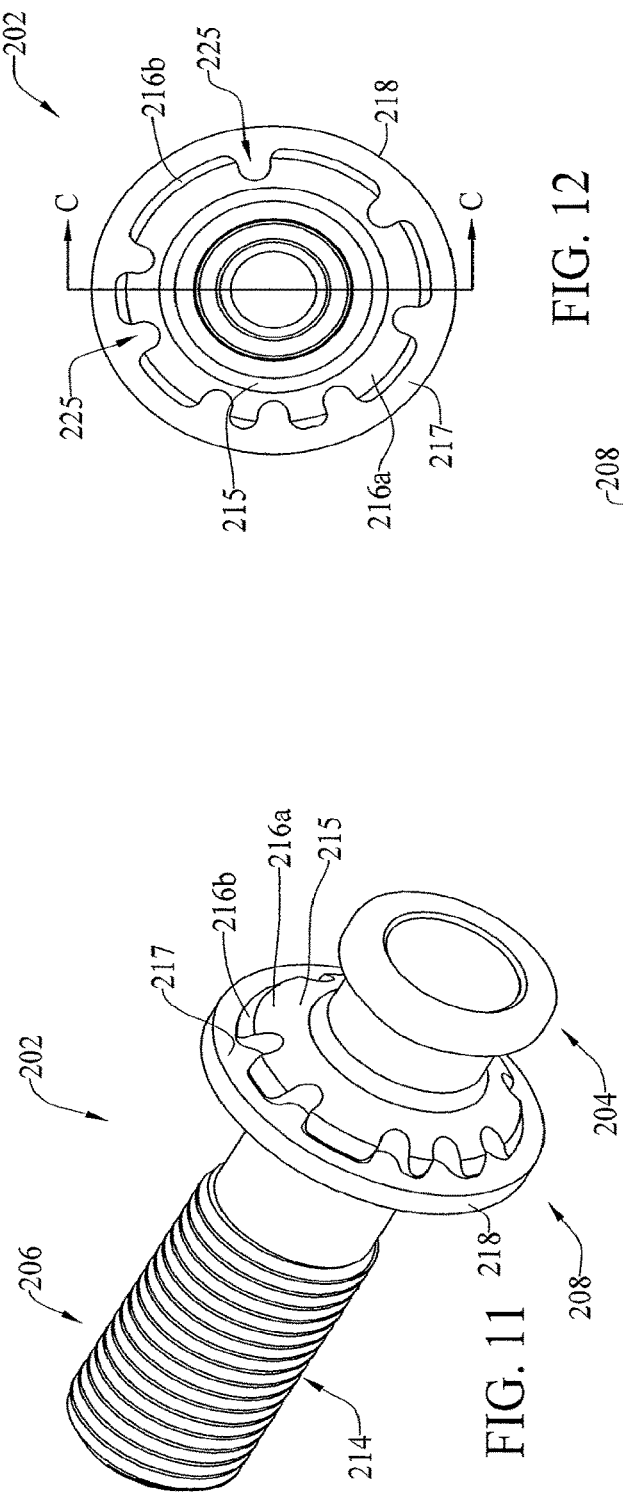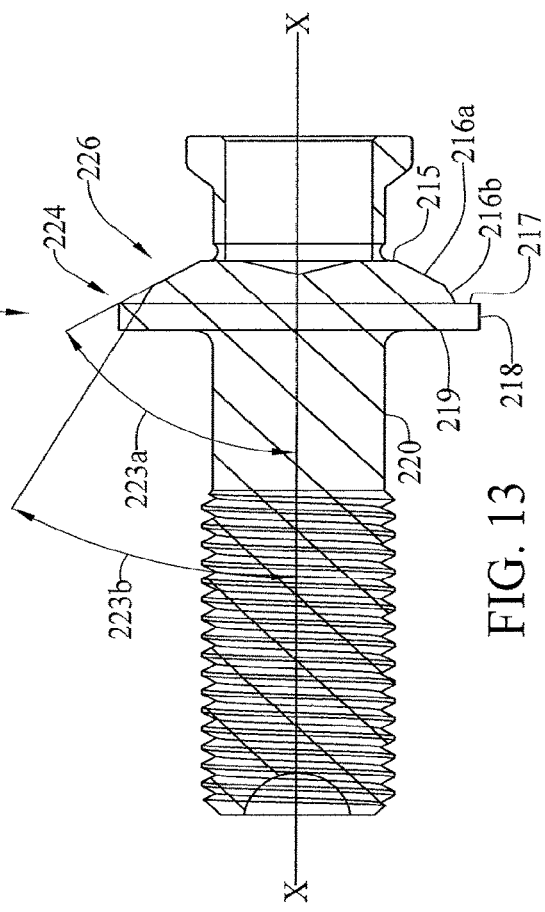
FIG. 12
FIG. 13
FIG. 11

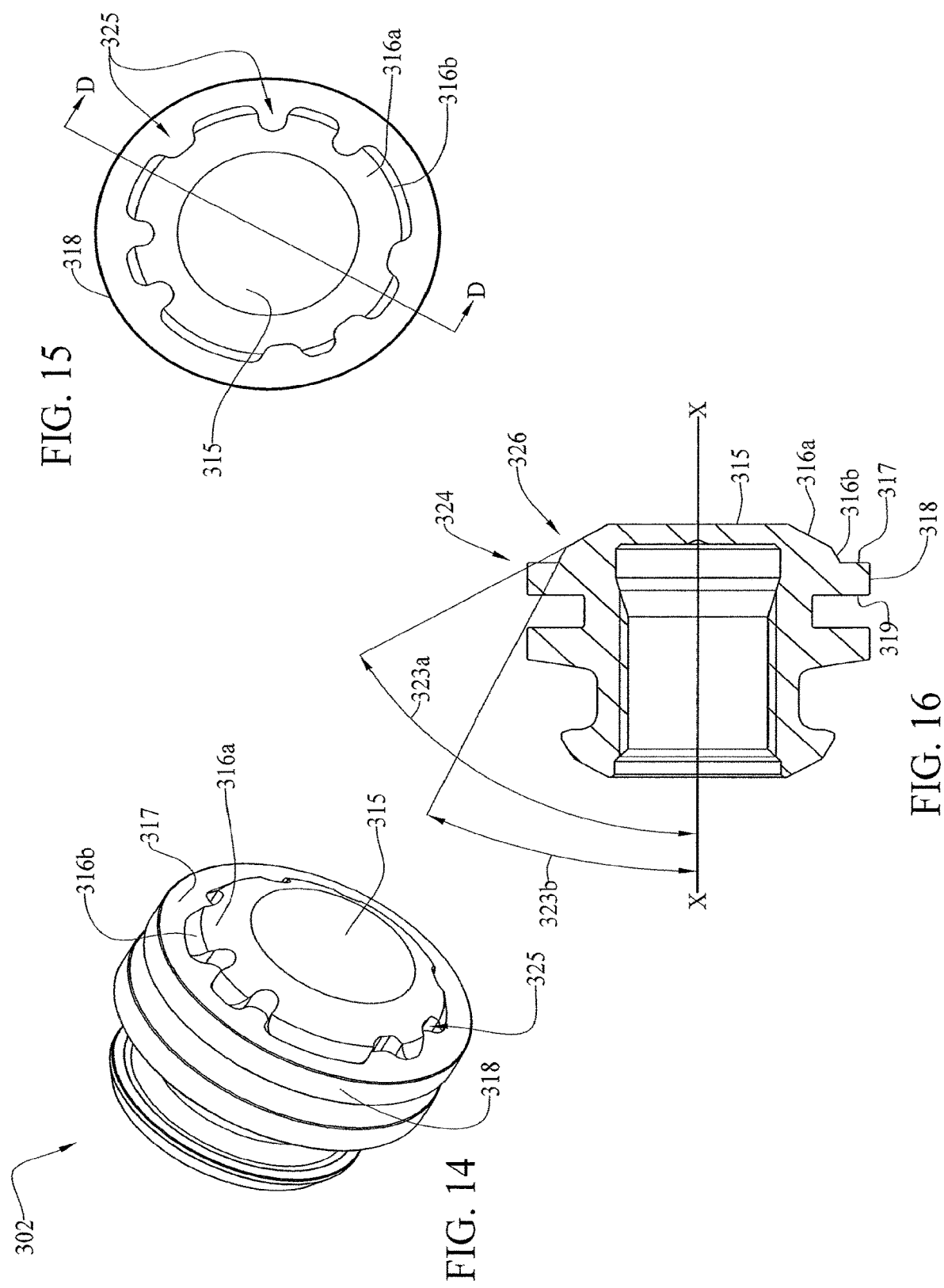

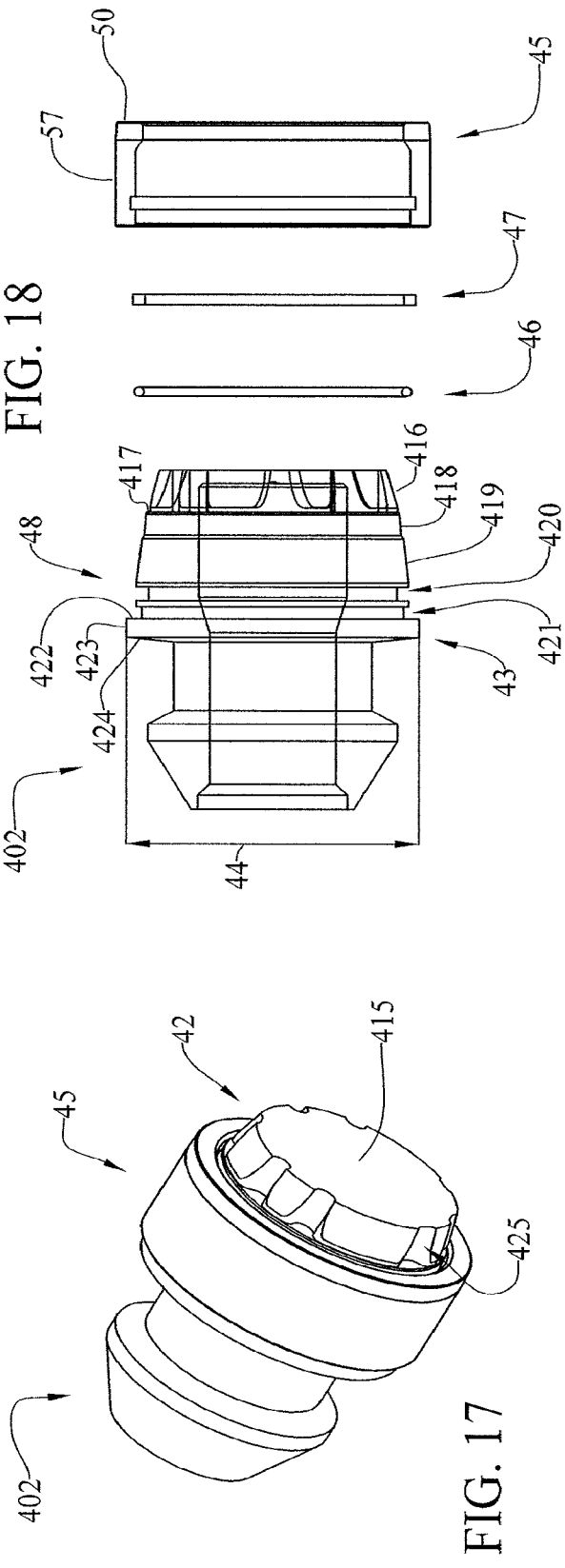

HIGH SECURITY FASTENER

RELATED APPLICATIONS

This application is a divisional of U.S. application Ser. No. 14/510,715, filed Oct. 9, 2014, which is incorporated herein by reference in its entirety.

TECHNICAL FIELD

The present disclosure relates to vehicle wheel fasteners, including lug bolts and lug nuts. More particularly, the disclosure concerns security fasteners for installation on vehicle wheels having a recess hole (including but not limited to metal alloy vehicle wheels).

BACKGROUND ART

By way of background, standard bolts and nuts have no security feature because they are designed to be fastened and unfastened using standard tools, such as wrenches, which can be easily obtained. For some fastener applications, such as the attachment of valuable assets, security fasteners have been developed to prevent unauthorized fastener removal and theft. One example is security locks for metal alloy vehicle wheels. Metal alloy wheels are typically formed with recess holes in which the security locks are wholly or partially recessed following installation. The recess may be relatively narrow and deep (as commonly found in tuner rims) or somewhat wider and shallower. In some cases the recess sidewall is of varying height such that the recess only partially recesses the security lock. Security locks designed for installation in recess holes include both lock bolts and lock nuts. Such locks are typically formed with a security groove pattern that is only exposed inside the entrance to the recess hole or, if exposed outside the entrance of the recess hole, includes a spin shroud. A special key having a matching security ridge pattern is required to install and remove the locks.

U.S. Patent Publication No. 2011/0116891, entitled "Security Fastener for Wheels with a Recess Hole," the aggregate disclosures of which is hereby incorporated by reference, is directed to a security fastener designed for installation on a wheel having a recess hole and discloses a number of configurations for both a bolt type and nut type security fastener. U.S. Pat. No. 7,445,414, entitled "High Security Fastener Constructions," the aggregate disclosures of which is hereby incorporated by reference, is directed to a security fastener featuring a rotatable anti-theft shroud.

BRIEF SUMMARY OF THE INVENTION

A security fastener (2, 102) for installation on a wheel (30, 130) having a recess hole (31, 131) extending from a recess entrance (33, 133) of a first diameter (34, 134) is provided comprising a threaded end portion (14, 114) concentric with a longitudinal axis (x-x) of the fastener; the threaded end portion configured and arranged to mate with a corresponding threaded element of the recess hole of the wheel when the fastener is installed in the recess hole; an intermediate skirt portion (24, 124) concentric with the longitudinal axis of the fastener and configured and arranged such that a side wall region (18, 118) of the skirt portion will extend within the recess hole when the fastener is installed in the recess hole; the side wall region of the intermediate skirt portion having a diameter (22, 122) within about 6 millimeters of the first diameter of the recess entrance; a drive portion (26, 126) having a tapered outer surface and a plurality of circumferentially spaced longitudinally extending key-receiving grooves (25, 125) in the tapered outer surface arranged in a lock pattern to which a driving torque may be applied; the drive portion configured and arranged such that the lock pattern will be exposed outside, at or inside the entrance to the recess hole when the fastener is installed in the recess hole; the tapered outer surface sloping downward and outward away from the longitudinal axis of the fastener from a top surface (15, 115) substantially perpendicular to the longitudinal axis of the fastener to the skirt portion at a taper angle from the longitudinal axis (23, 123) of at least 11 degrees.

The intermediate skirt portion may comprise an upper annular surface (15, 115) orientated substantially perpendicular to the longitudinal axis of the fastener and an outer cylindrical surface (18, 118) concentric with the longitudinal axis of the fastener. The sidewall region of the skirt portion may comprise the outer cylindrical surface concentric with the longitudinal axis of the fastener. The side wall region of the intermediate skirt portion may have a diameter within about 3 millimeters of the first diameter of the recess entrance. The taper angle of the tapered outer surface may be between about 29 degrees and about 61 degrees. The tapered outer surface may comprise a first tapered surface portion (216a, 316a) sloping downward from the top surface and outward away from the longitudinal axis of the fastener at a first taper angle from the longitudinal axis (223a, 323a) of at least 40 degrees and a second tapered surface portion (216b, 316b) sloping downward from the first surface portion and outward away from the longitudinal axis of the fastener at a second taper angle from the longitudinal axis (223b, 323b) that is less than the first taper angle. The first taper angle may be about 45 degrees and the second taper angle may be about 20 degrees. The tapered outer surface of the drive portion may have a Rockwell scale hardness of about HRc 60 or less. The taper angle and the hardness of the tapered outer surface of the drive portion may be governed by the function taper angle $\geq 11.25+((60-\text{taper hardness})*0.75)$, where "taper hardness" is the Rockwell scale hardness of the drive portion. The longitudinally extending key-receiving grooves may be defined by an arcuate surface (27, 127) extending radially inwards towards the longitudinal axis of the fastener from the tapered surface of the drive portion. The tapered outer surface may comprise a frusto-conical surface having an upper minor diameter (35, 135) and a lower major diameter (36, 136). The grooves may have an outer width (38, 138) at the major diameter from one side of the arcuate surface, where it intersects with the major diameter, to the other side of the arcuate surface, where it intersects with the major diameter, of less than about 26% of the major diameter. Each of the grooves may have a maximum radial depth (28, 128) inwards from the minor diameter of less than about 11% of the major diameter (36, 136). The drive portion may have a total outer surface area consisting of a tapered surface area of the tapered outer surface and a groove cutaway surface area of the grooves in the tapered outer surface and the tapered surface area may comprise at least about 59% of the total surface area. The threaded end portion may comprise an inner threaded bore (114) and the corresponding threaded element of the recess hole of the wheel may comprise an outer threaded stud (29) in the recess hole. The fastener may further comprise a break-away post (10) extending from the top surface of the drive portion. The fastener may further comprise a shroud (45) rotatable about the longitudinal axis relative to the intermediate skirt portion and extending over at least a portion of the fastener.

In another aspect, a security fastener for installation on a wheel having a recess hole extending from a recess entrance of a first diameter is provided comprising a threaded end portion concentric with a longitudinal axis of the fastener; the threaded end portion configured and arranged to mate with a corresponding inner threaded element of the recess hole of the wheel when the fastener is installed in the recess hole; an intermediate skirt portion concentric with the longitudinal axis of the fastener and configured and arranged such that a side wall region of the skirt portion will extend within the recess hole when the fastener is installed in the recess hole; the side wall region of the intermediate skirt portion having a diameter within about 6 millimeters of the first diameter of the recess entrance; a drive portion having a tapered outer surface concentric with the longitudinal axis of the fastener and a plurality of circumferentially spaced longitudinally extending key-receiving grooves in the tapered outer surface arranged in a lock pattern to which a driving torque may be applied; the drive portion configured and arranged such that the lock pattern will be exposed outside, at or inside the entrance to the recess hole when the fastener is installed in the recess hole; the tapered outer surface of the drive portion having a Rockwell scale hardness of about HRc 60 or less; the tapered outer surface sloping downward and outward away from the longitudinal axis of the fastener from a top surface substantially perpendicular to the longitudinal axis of the fastener to the skirt portion at a taper angle from the longitudinal axis of at least 11 degrees; and wherein the taper angle and the hardness of the tapered outer surface of the drive portion are governed by the function taper angle ≥11.25+((60−taper hardness)*0.75), where "taper hardness" is the Rockwell scale hardness of the drive portion.

The intermediate skirt portion may comprise an upper annular surface orientated substantially perpendicular to the longitudinal axis of the fastener and the sidewall region of the skirt portion may comprise an outer cylindrical surface concentric with the longitudinal axis of the fastener. The side wall region of the intermediate skirt portion may have a diameter within about 3 millimeters of the first diameter of the recess entrance. The taper angle of the tapered outer surface may be between about 29 degrees and about 61 degrees. The tapered outer surface may comprise a first tapered surface portion sloping downward from the top surface and outward away from the longitudinal axis of the fastener at a first taper angle of at least 40 degrees and a second tapered surface portion sloping downward from the first surface portion and outward away from the longitudinal axis of the fastener at a second taper angle that is less than the first taper angle. The first taper angle may be about 45 degrees and the second taper angle may be about 20 degrees. Each of the longitudinally extending key-receiving grooves may be defined by an arcuate surface extending radially inwards towards the longitudinal axis of the fastener from the tapered surface of the drive portion; the tapered outer surface may comprise a frusto-conical surface having an upper minor diameter and a lower major diameter; and each of the grooves may have an outer width at the major diameter from one side of the arcuate surface, where it intersects with the major diameter, to the other side of the arcuate surface, where it intersects with the major diameter, of less than about 26% of the major diameter. Each of the grooves may have a maximum radial depth inwards from the minor diameter of less than about 11% of the major diameter. The drive portion may have a total outer surface area consisting of a tapered surface area of the tapered outer surface and a groove cutaway surface area of the grooves in the tapered outer surface and the tapered surface area may comprise at least about 59% of the total surface area. The threaded end portion may comprise an inner threaded bore and the corresponding threaded element of the recess hole of the wheel may comprise an outer threaded stud in the recess hole. The fastener may further comprise a break-away post extending from the top surface of the drive portion. The fastener may further comprise a shroud rotatable about the longitudinal axis relative to the intermediate skirt portion and extending over at least a portion of the fastener.

In another aspect, a security fastener (502) for installation on a wheel (230) having a recess hole (231) extending from a recess entrance (233) of a first diameter (234) is provided comprising a threaded portion (514) concentric with a longitudinal axis (x-x) of the fastener; the threaded portion configured and arranged to mate with a corresponding threaded element of the recess hole of the wheel when the fastener is installed in the recess hole; a drive portion (526) having a tapered inner surface (516) concentric with the longitudinal axis of the fastener and a plurality of circumferentially spaced longitudinally extending key-receiving grooves (525) in the tapered inner surface arranged in a lock pattern to which a driving torque may be applied; the drive portion configured and arranged such that the lock pattern will be exposed outside, at or inside the entrance to the recess hole when the fastener is installed in the recess hole; the tapered inner surface sloping downward and inward toward the longitudinal axis of the fastener at a taper angle from the longitudinal axis (523) of at least 11 degrees.

The taper angle of the tapered inner surface may be between about 29 degrees and about 61 degrees. The tapered inner surface may comprise a first tapered surface portion (616a) sloping downward and inward toward the longitudinal axis of the fastener at a first taper angle from the longitudinal axis (623a) of at least 11 degrees and a second tapered surface portion (616b) sloping downward and inward toward the longitudinal axis of the fastener at a second taper angle from the longitudinal axis (623b) that is greater than the first taper angle. The first taper angle may be about 20 degrees and the second taper angle may be about 45 degrees. The tapered inner surface of the drive portion may have a Rockwell scale hardness of about HRc 60 or less. The taper angle and the hardness of the tapered inner surface of the drive portion may be governed by the function taper angle ≥11.25+((60−taper hardness)*0.75), where "taper hardness" is the Rockwell scale hardness of the drive portion. Each of the longitudinally extending key-receiving grooves may be defined by an arcuate surface (527) extending radially outward from the longitudinal axis of the fastener from the tapered surface of the drive portion. The tapered inner surface may comprise a frusto-conical surface having an upper major diameter (535). The drive portion may have a total inner surface area consisting of a tapered surface area of the tapered inner surface and a groove cutaway surface area of the grooves in the tapered inner surface and the tapered surface area may comprise at least about 59% of the total surface area. The threaded portion may comprise an inner threaded bore and the corresponding threaded element of the recess hole of the wheel may comprise an outer threaded stud in the recess hole.

BRIEF DESCRIPTION OF THE DRAWINGS

FIG. 1 is a perspective view of a first embodiment of an improved security fastener.

FIG. 2 is a front elevational view of the security fastener shown in FIG. 1.

FIG. 3 is a longitudinal vertical sectional view of the security fastener shown in FIG. 2, taken generally on line A-A of FIG. 2.

FIG. 11 is a perspective view of a third embodiment of an improved security fastener.

FIG. 12 is a front elevational view of the security fastener shown in FIG. 11.

FIG. 13 is a longitudinal vertical cross-sectional view of the security fastener shown in FIG. 12, taken generally on line C-C of FIG. 12.

FIG. 14 is a perspective view of a fourth embodiment of an improved security fastener.

FIG. 15 is a front elevational view of the security fastener shown in FIG. 14.

FIG. 16 is a longitudinal vertical sectional view of the security fastener shown in FIG. 15, taken generally on line D-D of FIG. 15.

FIG. 17 is a perspective view of a fifth embodiment of an improved security fastener.

FIG. 18 is an exploded view of the security fastener shown in FIG. 17.

FIG. 19 is a front elevational view of the security fastener shown in FIG. 17.

FIG. 20 is a longitudinal vertical cross-sectional view of the security fastener shown in FIG. 19, taken generally on line E-E of FIG. 19.

DETAILED DESCRIPTION OF THE PREFERRED EMBODIMENT

Figure 5:
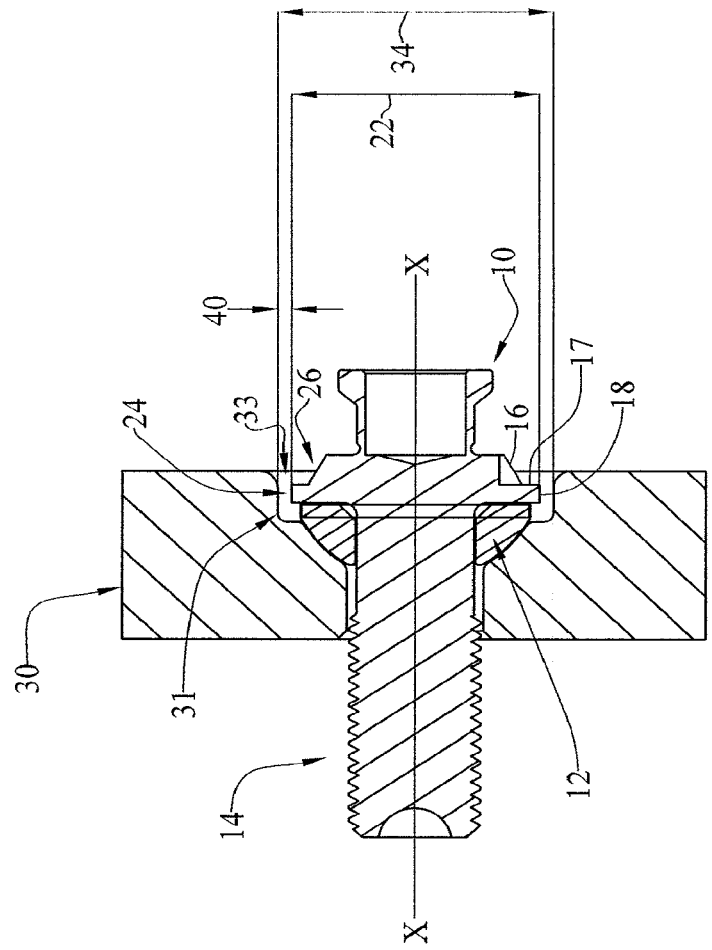
FIG. 5 is a vertical cross-sectional view of the example installation shown in FIG. 4.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

In this description, various example security fastener embodiments are disclosed. The disclosed security fasteners are suited for installation in wheels or other structures wherein the fasteners are received in a recess hole. As described in more detail below, such recess holes may have a variety of configurations. Advantageously, the disclosed security fasteners are optimized to use the recess hole as a security enhancer to prevent fastener removal using unauthorized tools. In particular, the security fasteners are designed so that they can only be removed using an authorized key to engage a fastener key-receiving portion that is at least partially protected by the recess hole that forms part of each fastener installation. Any attempt to rotate the fastener by gripping other exposed locations on the fastener will not succeed. Example fastener types include threaded bolts and nuts. Unless otherwise indicated, all components described herein may be formed from a suitable metal, including but not limited to steel, stainless steel, brass, aluminum, titanium, as well as other metals and alloys. Non-metallic materials could potentially also be used for some applications.

Referring now to FIGS. 1-5, an improved safety fastener is provided, a first bolt-type embodiment of which is generally indicated at 2. Bolt fastener 2 includes first end portion 4, second end portion 6 and medial (intermediate) portion 8 disposed between first end portion 4 and second end portion 6.

First end portion 4 of bolt fastener 2 comprises a generally cylindrical lock post 10. In this embodiment, lock post 10 is formed as an integral part of the fastener body. However, lock post 10 could be a separately mounted component. Lock post 10 is formed with an undercut annular groove 11 at the base thereof whose diameter is less than the main diameter of post 10. Groove 11 provides an area of weakness that allows lock post 10 to serve as a security structure, namely, by acting as a breakaway post that will break off at groove 11 if removal of fastener 2 is attempted by gripping first end portion 4 using an unauthorized tool.

Second end portion 6 of bolt fastener 2 includes shank 14, which is externally threaded over a portion or all of its length. Second end portion 6 may further include an external seat formed by a floating cone-shaped seat washer 12 mounted on shank 14.

Medial portion 8 of bolt fastener 2 has a specially configured outer profile. In particular, and with reference to FIG. 3, medial portion 8 is a specially-configured solid member elongated along axis x-x, and is bounded by rightwardly-facing annular vertical surface 15, rightwardly and outwardly-facing frusto-conical surface 16, rightwardly-facing annular vertical surface 17, outwardly-facing horizontal cylindrical surface 18, and leftwardly-facing annular vertical surface 19, joined at its inner marginal end to the right marginal end of outwardly-facing horizontal cylindrical surface 20 of shank 14. Surface 16 and grooves 25 generally form drive portion 26. Frusta-conical surface 16 has an upper minor diameter 35 at its junction with surface 15 and a lower major diameter 36 at its junction with surface 17. Surfaces 17, 18 and 19 generally form skirt portion 24 and surface 18 generally provides a cylindrical sidewall region having outer diameter 22.

In this embodiment, surface 16 is tapered or sloped downward or leftward from top surface 15 and outward away from longitudinal axis x-x at a tapered angle 23 from axis x-x of at least 11 degrees. In this embodiment, tapered angle 23 is about 30 degrees. Frusto-conical surface 16 provides an outer tapered surface that services as a security feature in that it is difficult to grip using an unauthorized tool. Should an attempt be made to rotate bolt fastener 2 by griping on surface 16 using an unauthorized tool, such tool will tend to slip on tapered surface 16 and it will tend to be difficult to find an attack point on bolt fastener 2.

Taper angle 23 of surface 16 may be varied, and such variations may be a function of the hardness of the material forming drive portion 26 of fastener 2. For example, taper angle 23 may be between about 29 degrees and about 61 degrees. Tapered outer surface 16 may have a Rockwell scale hardness of about HRe 60 or less. Taper angle 23 and the hardness of tapered surface 16 of drive portion 26 may be governed by the function: taper angle ≥11.25+((60−taper hardness)×0.75), where the "taper hardness" is the Rockwell scale hardness of drive portion 26.

As shown in FIGS. 1-5, drive portion 26 has a key-receiving pattern that may be implemented as a set of circumferentially spaced longitudinally extending key-receiving grooves 25 in tapered surface 16 arranged in a lock pattern to which a drive torque may be applied. Lock pattern configurations that use formations of other than grooves could potentially also be used. Each lock pattern groove 25 is formed by a generally arcuate surface 27 extending radially inwards towards longitudinal axis x-x of fastener 2 from tapered surface 16 of drive portion 26. Surface 27 thereby intersects and forms an edge at its respective junction with tapered surface 16. In this embodiment, each of grooves 25 has an outer width 38 at major diameter 36 from one side of arcuate surface 27, where it intersects with major diameter 36, to the other side of arcuate surface 27, where it again intersects with major diameter 36, of less than about 26% of major diameter 36. Each of grooves 25 also has an inner width 37 at minor diameter 35 from one side of arcuate surface 27, where it intersects with minor diameter 35, to the other side of arcuate surface 27, where it intersects again with minor diameter 35. In this embodiment, each of grooves 25 has a maximum radial depth 28 inwards from minor diameter 35 of less than about 11% of major diameter 36. Each of grooves 25 has a radial depth 39 inwards from major diameter 36 that is greater than radial depth 28 inwards from minor diameter 35.

Drive portion 26 has a total outer surface area consisting of the tapered surface area of tapered outer surface 16 and the groove cutaway surface area of grooves 25 in tapered outer surface 16. In this embodiment, this tapered surface area comprises at least about 59% of the total surface area. In order to impart lock pattern uniqueness, the lock pattern grooves 25 may be patterned in any suitable manner, such as by employing a selected number of grooves or varying the spacing between grooves and/or the width, length or depth of the grooves.

A key (not shown) may be used to engage lock pattern grooves 25. The key includes a socket and a drive portion. The entrance to the socket is formed with a key pattern that may be implemented as a set of circumferentially arranged key pattern lobes. The key pattern lobes are configured and arranged to engage lock pattern grooves 25 when the socket is placed over end portion 4 of bolt fastener 2. Behind the key pattern lobes, the socket is substantially cylindrical and sized to accommodate first end 4 of bolt fastener 2. The drive portion of the key may be formed with a conventional hex (or other) configuration for engagement by a standard wrench or drive tool.

Figure 4:
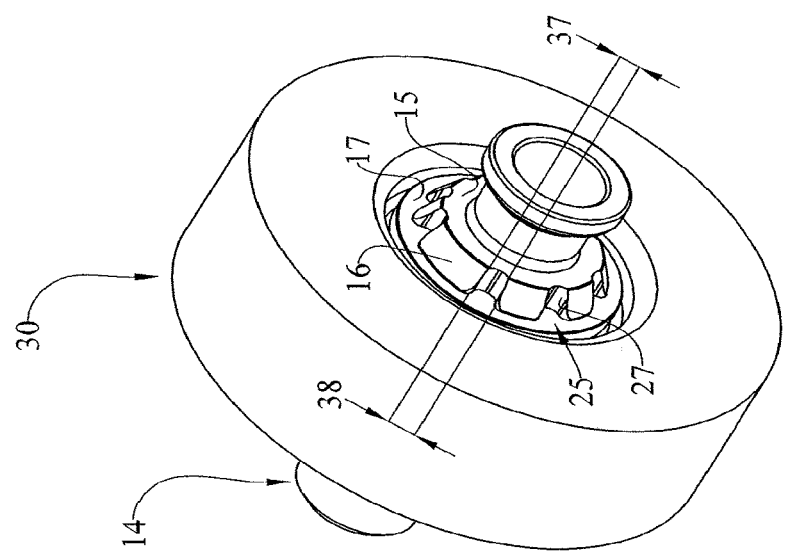
FIG. 4 is a perspective view of an example installation of the security fastener shown in FIG. 1.

Turning now to FIGS. 4-5, an example installation is shown in which bolt fastener 2 is mounted on a wheel, represented at 30, that has at least one fastener-receiving recess hole 31. Examples of such a wheel includes, but is not limited to, metal alloy vehicle wheels that are cast or forged from a lightweight metal, such as alloys of aluminum, magnesium or titanium.

As shown, bolt fastener 2 is installed in recess hole 31, which in this embodiment is a relatively deep cylindrical well, having annular recess entrance 33 of diameter 34. In this installation, first end portion 4 of bolt fastener 2 is arranged so that it will be exposed outside entrance 33 to recess hole 31 when bolt fastener 2 is threadedly installed therein. As previously stated, the breakaway configuration of lock post 10 provides a security feature that protects first end portion 4 from being used as an attack point for unauthorized tools. Should an attempt be made to rotate bolt fastener 2 by gripping first end portion 4, its breakaway post construction will tend to produce a break at lock post groove 11.

The medial portion 8 of bolt fastener 2 is arranged so that sidewall 18 of skirt 24 thereof extends within recess hole 31. In this position, only drive portion 26, situated on the upper side of surface 17 of skirt 24, is exposed outside recess hole entrance 34. Thus, access to skirt 24 and annular surface 18, which is not tapered in this embodiment relative to axis x-x, is limited by circumferential gap 40 between outer diameter 22 of skirt 24 and inner diameter 34 of recess entrance 33 of recess hole 31. The size of gap space 40 can be controlled by sizing diameter 22 of skirt 24 according to diameter 34 of recess hole 31. In this way, medial portion 8 can be configured to provide a fastener security feature. In this embodiment, gap 40 is equal to or less than about 6 millimeters and more preferably is equal to or less than about 3 millimeters.

Turning now to FIGS. 6-10, a nut-type security fastener 102 according to a second example embodiment is shown. While nut fastener 102 is similar to the above-described bolt fastener 2 with respect to their drive portions, nut fastener 102 does not include a first end portion 4 having a generally cylindrical lock post 10.

Figure 8:
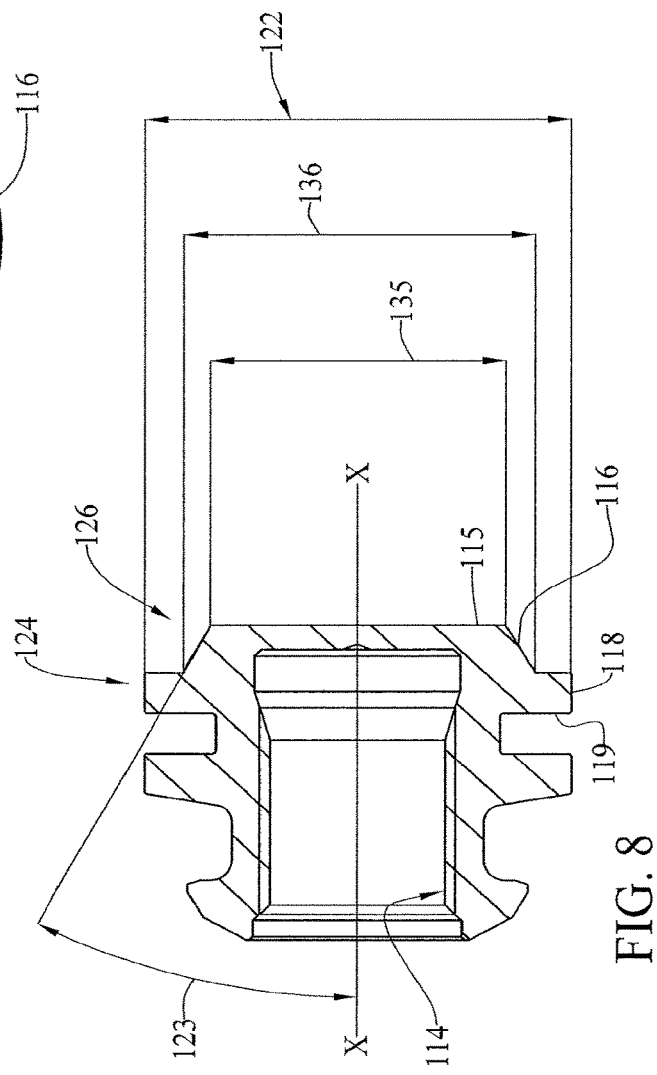
FIG. 8 is a longitudinal vertical cross-sectional view of the security fastener shown in FIG. 7, taken generally on line B-B of FIG. 7.

Second end portion 106 of nut fastener 102 includes bore 114 that is internally threaded over a portion (or all) of its length. As shown in FIG. 8, bore 114 extends only partially through nut fastener 102. Second end portion 106 may further include an external spin washer 60 mounted on the left end of portion 106.

Like bolt fastener 2, nut fastener 102 has a specially configured outer drive and skirt profile. In particular, and with reference to FIG. 8, skirt and drive portions 124 and 126, respectively, of nut fastener 102 are a specially-configured solid member elongated along axis x-x, and are bounded by rightwardly-facing annular vertical surface 115, rightwardly and outwardly-facing frusto-conical surface 116, rightwardly-facing annular vertical surface 117, outwardly-facing horizontal cylindrical surface 118, and leftwardly-facing annular vertical surface 119. Surface 116 and grooves 125 generally form drive portion 126. Frusto-conical surface 116 has an upper minor diameter 135 at its junction with surface 115 and a lower major diameter 136 at its junction with surface 117. Surfaces 117, 118 and 119 generally form skirt portion 124 and surface 118 generally provides a cylindrical sidewall region having outer diameter 122. In this embodiment, surface 116 is tapered or sloped downward or leftward from top surface 115 and outward away from longitudinal axis x-x at a tapered angle 123 from axis x-x of at least 11 degrees. In this embodiment, tapered angle 123 is about 30 degrees. As described above, frusto-conical surface 116 provides an outer tapered surface that services as a security feature in that it is difficult to grip using an unauthorized tool. Should an attempt be made to rotate nut fastener 102 by griping on surface 116 using an unauthorized tool, such tool will tend to slide on tapered surface 116 and it will tend to be difficult to find an attack point on nut fastener 102.

As with bolt fastener 2, taper angle 123 of surface 116 may be varied, and such variations may be a function of the hardness of the material forming drive portion 126 of fastener 102. For example, taper angle 123 may be between about 29 degrees and about 61 degrees. Tapered outer surface 116 may have a Rockwell scale hardness of about HRc 60 or less. Taper angle 123 and the hardness of tapered surface 116 of drive portion 126 may be governed by the function: taper angle $\geq 11.25 + ((60 - \text{taper hardness}) \times 0.75)$, where the "taper hardness" is the Rockwell scale hardness of drive portion 126.

Figure 7:
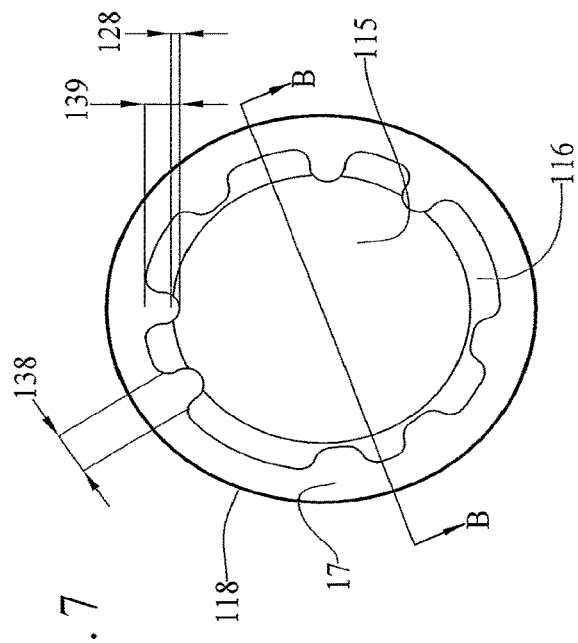
FIG. 7 is a front elevational view of the security fastener shown in FIG. 6.
Figure 6:
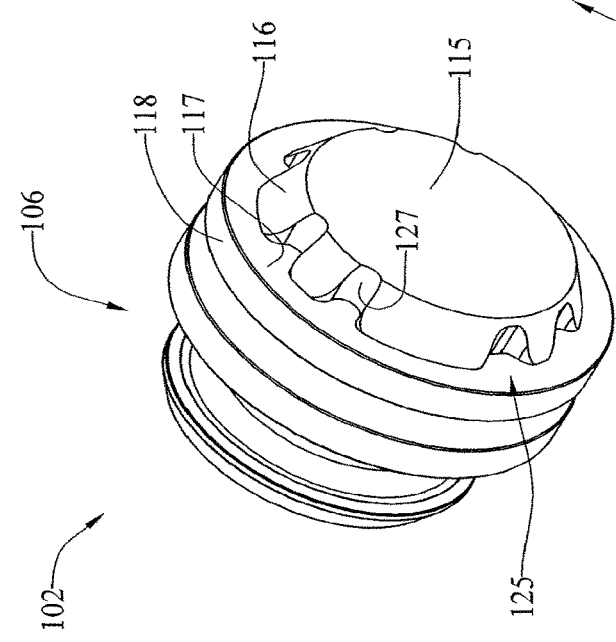
FIG. 6 is a perspective view of a second embodiment of an improved security fastener.

As shown and described with respect to fastener 2, drive portion 126 has a key-receiving pattern that may be implemented as a set of circumferentially spaced longitudinally extending key-receiving grooves 125 in tapered surface 116 arranged in a lock pattern to which a drive torque may be applied, in the same manner as the lock pattern grooves 25 of bolt fastener 2 described above. In FIGS. 6-8, each lock pattern groove 125 is formed by a generally arcuate surface 127 extending radially inwards towards longitudinal axis x-x of fastener 102 from tapered surface 116 of drive portion 126. Surface 127 thereby intersects and forms an edge at its respective junction with tapered surface 116. In this embodiment, each of grooves 125 has an outer width 138 at major diameter 136 from one side of arcuate surface 127, where it intersects with major diameter 136, to the other side of arcuate surface 127, where it intersects with major diameter 136, of less than about 26% of major diameter 136. In this embodiment, each of grooves 125 has a maximum radial depth 139 inwards from minor diameter 135 of less than about 11% of major diameter 136. In this embodiment, each of grooves 125 has a maximum radial depth 128 inwards from minor diameter 135 of less than about 11% of major diameter 136. Each of grooves 125 has a radial depth 139 inwards from major diameter 136 that is greater than radial depth 128 inwards from minor diameter 135.

Drive portion 126 has a total outer surface area consisting of the tapered surface area of tapered outer surface 116 and the groove cutaway surface area of grooves 125 in tapered outer surface 116. In this embodiment, this tapered surface area comprises at least about 59% of the total surface area.

As described above in connection with the bolt fastener 2, a key may be used to engage lock pattern grooves 125. The key pattern lobes are configured and arranged to engage the lock pattern grooves 125 when the socket is placed over top surface 115 of nut fastener 102.

Figure 10:
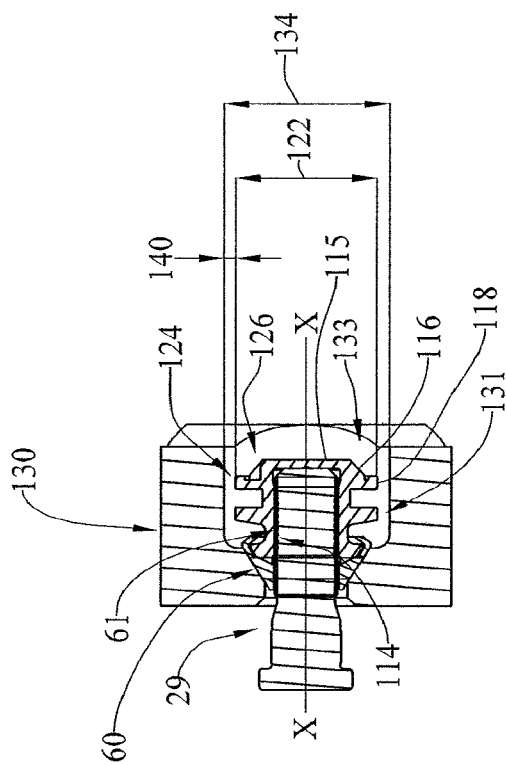
FIG. 10 is a vertical cross-sectional view of the example installation shown in FIG. 9.
Figure 9:
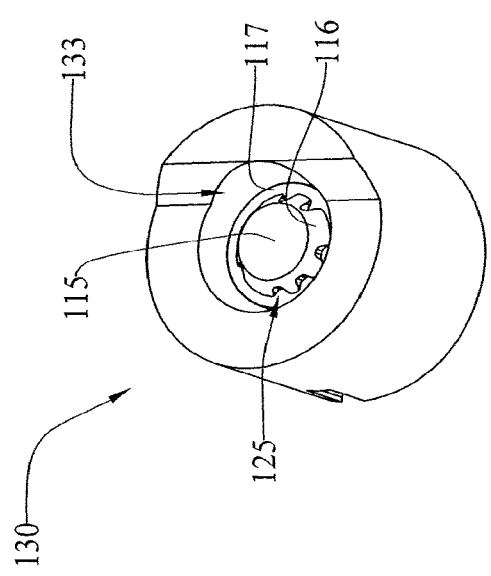
FIG. 9 is a perspective view of an example installation of the security fastener shown in FIG. 6.
Figure 22:
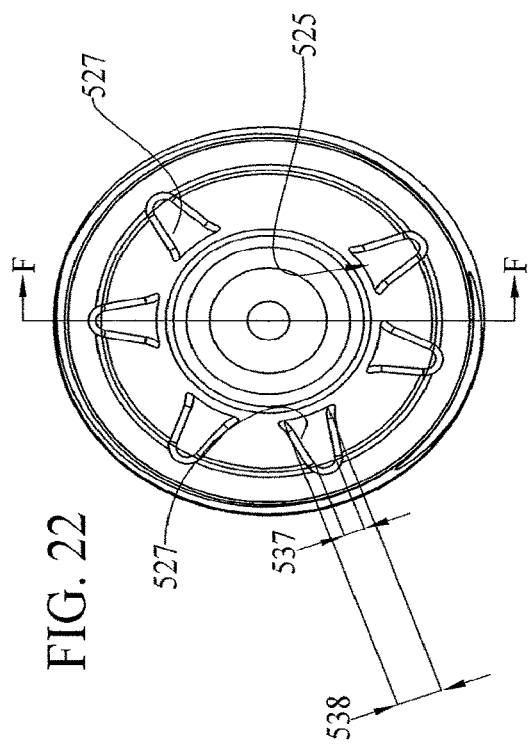
FIG. 22 is a front elevational view of the security fastener shown in FIG. 21.

Turning now to FIGS. 9-10, an example installation is shown in which nut fastener 102 is mounted on wheel 130 having recess hole 133. As shown, fastener-receiving recess hole 131 of wheel 130 has an annular recess entrance 133 of diameter 134. As shown in FIG. 10, wheel stud 29 extends through the left side of recess hole such that the right end of wheel stud or post 29 is interior to hole 131 and entrance 133. The exterior right end portion 61 of post 29 is threaded and nut fastener 102 is sized and installed such that the interior threads of inner bore 114 engage the exterior threads of end portion 61 of post 29. In this installation, drive portion 126 of nut fastener 102 is arranged so that it is not exposed outside entrance 133 to recess hole 131 when nut fastener 102 is rotationally installed on wheel stud 29.

Skirt portion 124 of nut fastener 102 is arranged so that sidewall 118 of skirt 124 thereof extends within recess hole 131. Also, in this embodiment, drive portion 126, situated on the upper side of surface 117 of skirt 124, is exposed inside recess hole entrance 133. In this position, access to skirt 124 and annular surface 118, which is not tapered in this embodiment relative to axis x-x, is limited by circumferential gap 140 between outer diameter 122 of skirt 124 and inner diameter 134 of recess entrance 133 of recess hole 131. The size of gap space 140 can be controlled by sizing diameter 122 of skirt 124 according to diameter 134 of recess hole 131. As stated above in connection with the bolt fastener 2, in this embodiment gap 140 is equal to or less than about 6 millimeters and more preferably is equal to or less than about 3 millimeters.

Turning now to FIGS. 11-13, a bolt-type security fastener 202 according to a third example embodiment is shown. Bolt fastener 202 has many of the features of bolt fastener 2 described above in connection with FIGS. 1-5. The major difference between bolt fastener 202 and bolt fastener 2 lies in the fact that drive portion 226 of bolt fastener 202 is formed with a double tapper.

In particular, and with reference to FIG. 13, medial portion 208 is a specially-configured solid member elongated along axis x-x, and is bounded by rightwardly-facing annular vertical surface 215, first rightwardly and outwardly-facing frusto-conical surface 216a, second rightwardly and outwardly-facing frusto-conical surface 216b, rightwardly-facing annular vertical surface 217, outwardly-facing horizontal cylindrical surface 218, and leftwardly-facing annular vertical surface 219, joined at its inner marginal end to the right marginal end of outwardly-facing horizontal cylindrical surface 220 of shank 214. Surfaces 216a and 216b and grooves 225 generally form drive portion 226. Surfaces 217, 218 and 219 generally form skirt portion 224 and surface 218 generally provides a cylindrical sidewall region.

In this embodiment, surface 216a is tapered or sloped downward or leftward from top surface 215 and outward away from longitudinal axis x-x at a tapered angle 223a from axis x-x of at least 40 degrees. In this embodiment, tapered angle 223a is about 60 degrees. Surface 216b is tapered or sloped downward or leftward from first tapered surface 216a and outward away from longitudinal axis x-x at a tapered angle 223b of less than 40 degrees. In this embodiment, tapered angle 223b is about 30 degrees. As with bolt fastener 2, frusto-conical surfaces 216a and 216b provide an outer tapered or sloped surface that services as a security feature in that it is difficult to grip using an unauthorized tool. Should an attempt be made to rotate bolt fastener 202 by griping on surfaces 216a and 216b using an unauthorized tool, such tool will tend to slide on tapered surfaces 216a and 216b and it will tend to be difficult to find an attack point on bolt fastener 202.

As shown and described with respect to fastener 2, drive portion 226 has a key-receiving pattern that may be implemented as a set of circumferentially spaced longitudinally extending key-receiving grooves 225 in tapered surfaces 216a and 216b arranged in a lock pattern to which a drive torque may be applied, in the same manner as the lock pattern grooves 25 of bolt fastener 2 described above.

Turning now to FIGS. 14-16, a nut-type security fastener 302 according to a fourth example embodiment is shown. Nut fastener 302 has many of the features of nut fastener 102 described above in connection with FIGS. 6-10. The major difference between nut fastener 302 and nut fastener 102 lies in the fact that drive portion 324 of nut fastener 302 is formed with a double tapper.

In particular, and with reference to FIG. 16, skirt and drive portions 324 and 326, respectively, of nut fastener 302 are a specially-configured solid member elongated along axis x-x, and are bounded by rightwardly-facing annular vertical surface 315, first rightwardly and outwardly-facing frusto-conical surface 316a, second rightwardly and outwardly-facing frusto-conical surface 316b, rightwardly-facing annular vertical surface 317, outwardly-facing horizontal cylindrical surface 318, and leftwardly-facing annular vertical surface 319. Surfaces 316a and 316b and grooves 325 generally form drive portion 326. Surfaces 317, 318 and 319 generally form skirt portion 324 and surface 318 generally provides a cylindrical sidewall region.

In this embodiment, surface 316a is tapered or sloped downward or leftward from top surface 315 and outward away from longitudinal axis x-x at a tapered angle 323a from axis x-x of at least 40 degrees. In this embodiment, tapered angle 323a is about 45 degrees. Surface 316b is tapered or sloped downward or leftward from first tapered surface 316a and outward away from longitudinal axis x-x at a tapered angle 323b of less than about 40 degrees. In this embodiment, tapered angle 323b is about 20 degrees. As with bolt fastener 102, frusto-conical surfaces 316a and 316b provide an outer tapered or sloped surface that services as a security feature in that it is difficult to grip using an unauthorized tool. Should an attempt be made to rotate nut fastener 302 by griping on surfaces 316a and 316b using an unauthorized tool, such tool will tend to slid on tapered surfaces 316a and 316b and it will tend to be difficult to find an attack point on bolt fastener 302.

As shown and described with respect to fastener 102, drive portion 326 has a key-receiving pattern that may be implemented as a set of circumferentially spaced longitudinally extending key-receiving grooves 325 in tapered surfaces 316a and 316b arranged in a lock pattern to which a drive torque may be applied, in the same manner as the lock pattern grooves 125 of nut fastener 102 described above.

Turning now to FIGS. 17-20, a nut-type security fastener 402 according to a fifth example embodiment is shown. Nut fastener 402 is similar in most respects to nut fastener 102 described above. The difference between the nut fastener 402 and the nut fastener 102 lies in the fact that the fastener 402 of the current embodiment includes spin shroud 45 and nut fastener 402 includes a specially configured corresponding mounting seat 48.

With reference to FIGS. 18 and 20, drive portion 42, shroud mounting seat 48, and skirt 43 of nut fastener 402 are a specially-configured solid member elongated along axis x-x, and are generally bounded by rightwardly-facing annular vertical surface 415, rightwardly and outwardly-facing frusto-conical surface 416, rightwardly-facing annular vertical surface 417, rightwardly and outwardly-facing frusto-conical surface 418, rightwardly and outwardly-facing frusto-conical surface 419, inwardly-extending and outwardly-facing annular rectangular snap ring groove 420, inwardly-extending and outwardly-facing annular O-ring groove 421, rightwardly-facing annular vertical surface 422, outwardly-facing horizontal cylindrical surface 423, and leftwardly-facing annular vertical surface 424. Surface 416 and grooves 425 generally form drive portion 42. Surfaces 418-422 generally define spin shroud mounting seat 48, and surfaces 423 and 424 generally form skirt portion 43 and surface 423 generally provides a cylindrical sidewall region having outer diameter 44.

As shown in FIG. 18, shroud 45 is generally a cylindrical ring-shaped annular structure. Referring now to FIGS. 18 and 20, this ring-shaped structure is a specially-configured solid member elongated along axis x-x, and is generally bounded by rightwardly-facing annular vertical surface 50, inwardly-facing horizontal cylindrical surface 51, leftwardly and inwardly-facing frusto-conical surface 52, inwardly-facing horizontal cylindrical surface 53, outwardly-extending and inwardly-facing annular rectangular snap ring groove 54, outwardly-extending and inwardly-facing annular O-ring groove 55, leftwardly-facing annular vertical surface 56, and outwardly-facing horizontal cylindrical surface 57, joined at its right marginal end to the outer marginal end of surface 50. As shown, shroud 45 is held in sliding rotational relationship to shroud mounting seat 48 of nut fastener 402 by snap ring 47 and rotates about axis x-x relative to nut fastener 402 by sliding around O-ring 46. Snap ring 47 is held within snap ring seat or groove 54 of shroud 45 and the opposed and corresponding snap ring groove 420 in mounting seat 48 of nut fastener 402.

Nut fastener 402 is arranged so that sidewall 423 of skirt 43 extends within recess hole 131. In this position, only shrouded portion 48 and drive portion 42, situated on the upper side of surface 422 of skirt 424, are exposed outside recess hole entrance 134. In this position, access to skirt 424 and annular surface 422, which is not tapered in this embodiment relative to axis x-x, is limited by a circumferential gap between outer diameter 44 of skirt 43 and inner diameter 134 of recess entrance 133 of recess hole 131. The size of the gap space can be controlled by sizing diameter 44 of skirt 43 according to diameter 134 of recess hole 131.

As described above, frusto-conical surface 416 provides an outer tapered surface that services as a security feature in that it is difficult to grip using an unauthorized tool. Should an attempt be made to rotate nut fastener 402 by griping on surface 416 using an unauthorized tool, such tool will tend to slid on tapered surface 416 and it will tend to be difficult to find an attack point on nut fastener 402. In addition, should an attempt be made to rotate nut fastener 402 by griping on outer surfaces 56, 57 or 50 of spinning shroud 45 and applying a rotational torque, because shroud 45 is relatively free to spin about axis x-x relative to fastener 402, such rotational torque applied to shroud 45 is not transferred to fastener 402.

Turning now to FIGS. 21-25, an inverted bolt-type security fastener 502 according to a sixth example embodiment is shown. Inverted bolt fastener 502 has a number of the features of bolt fastener 2 described above in connection with FIGS. 1-5. The major difference between bolt fastener 502 and bolt fastener 2 lies in the fact that drive portion 526 is generally inverted relative to drive portion 26 of bolt fastener 2.

While fastener 502 is similar to the above-described bolt fastener 2 with respect to their end portions 506 and 6, respectively, bolt fastener 502 does not include a first end portion 4 having a generally cylindrical lock post 10. In addition, bolt fastener 502 does not include an outwardly extending skirt 24 below an outwardly-facing drive portion 26. Instead, fastener 502 has an internally-facing drive portion 526 opposite an outwardly-facing threaded surface 518.

Figure 21:
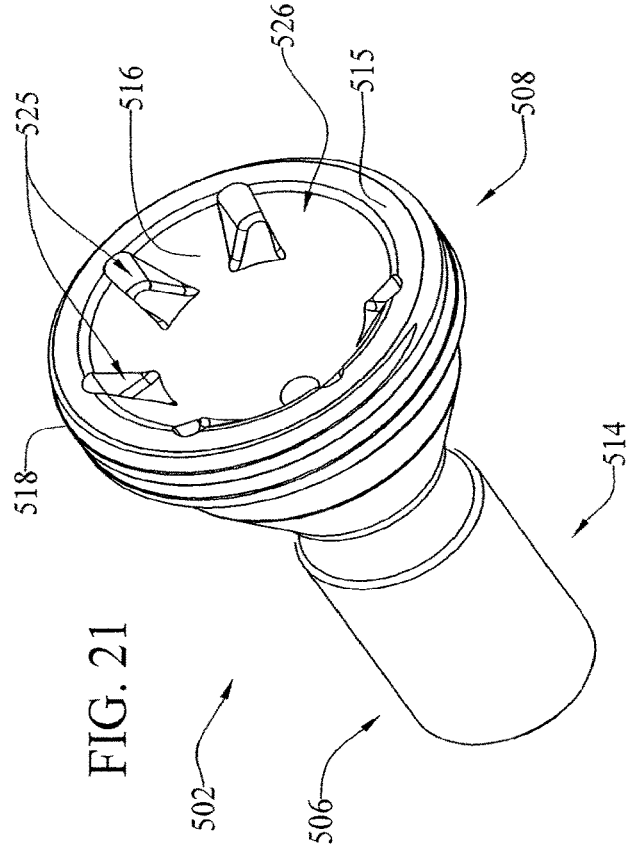
FIG. 21 is a perspective view of sixth embodiment of an improved security fastener.
Figure 23:
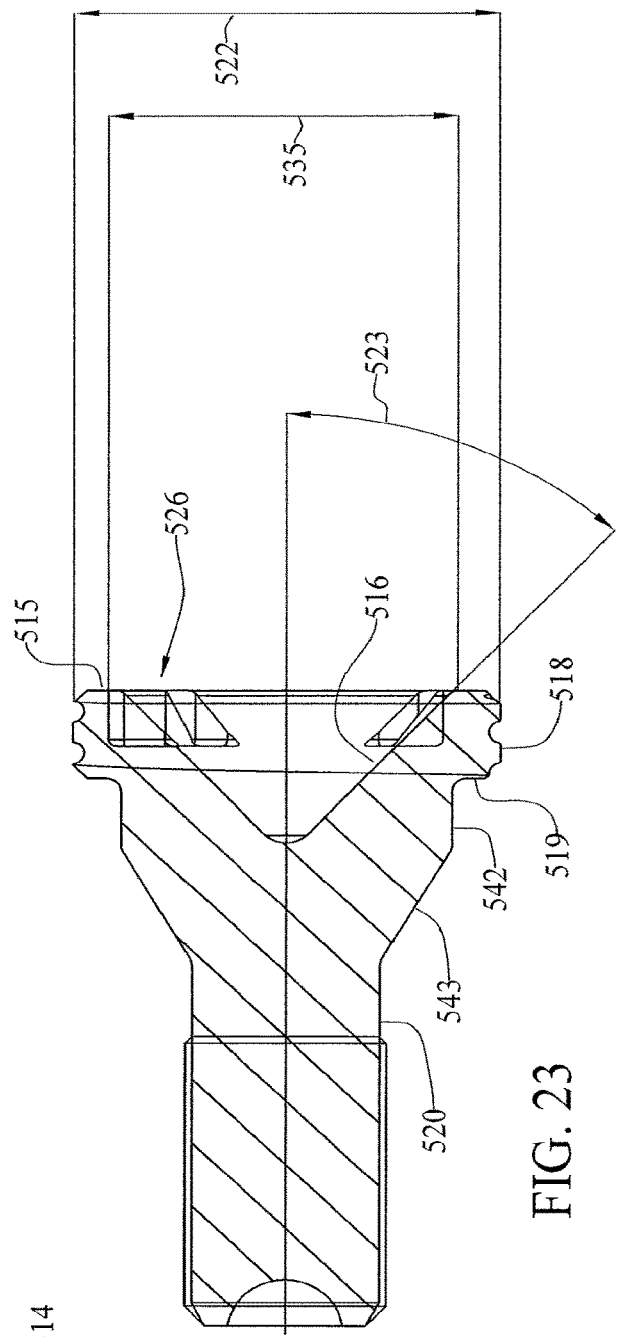
FIG. 23 is a longitudinal vertical cross-sectional view of the security fastener shown in FIG. 22, taken generally on line F-F of FIG. 22.

As shown in FIG. 21, bolt fastener 502 includes end portion 506 and cone portion 508. End portion 506 of bolt fastener 502 includes shank 514, which is externally threaded over a portion or all of its length. Cone portion 508 of bolt fastener 502 has a specially configured internal profile. In particular, and with reference to FIG. 23, cone portion 508 is a specially-configured solid member elongated along axis x-x, and is bounded by rightwardly and inwardly-facing frusto-conical surface 516, rightwardly-facing annular vertical surface 515, outwardly-facing horizontal cylindrical surface 518, leftwardly-facing annular vertical surface 519, outwardly-facing horizontal cylindrical surface 542, and leftwardly and outwardly-facing frusto-conical surface 543, joined at its inner marginal end to the right marginal end of outwardly-facing horizontal cylindrical surface 520 of shank 514. Surface 516 and grooves 525 generally form drive portion 526. Frusto-conical surface 516 has an upper major diameter 535 at its junction with surface 515.

As shown, in this embodiment surface 518 is a threaded surface and generally provides a cylindrical sidewall region having outer diameter 522. In this embodiment, surface 516 is tapered or sloped downward or leftward from top surface 515 and inward toward longitudinal axis x-x at a tapered angle 523 from axis x-x of at least 11 degrees. In this embodiment, tapered angle 23 is about 45 degrees. Frusto-conical surface 516 provides an inner tapered surface that services as a security feature in that it is difficult to grip using an unauthorized tool. Should an attempt be made to rotate bolt fastener 502 by griping against surface 516 using an unauthorized tool, such tool will tend to slid on tapered surface 516 and it will tend to be difficult to find an attack point on bolt fastener 502.

The taper angle 523 of surface 516 may be varied, and such variations may be a function of the hardness of the material forming drive portion 526 of fastener 502. For example, taper angle 523 may be between about 29 degrees and about 61 degrees. Tapered outer surface 516 may have a Rockwell scale hardness of about HRc 60 or less. Taper angle 523 and the hardness of tapered surface 516 of drive portion 526 may be governed by the function: taper angle $\geq 11.25+((60-\text{taper hardness})\times 0.75)$, where the "taper hardness" is the Rockwell scale hardness of drive portion 526.

As shown, drive portion 526 has a key-receiving pattern that may be implemented as a set of circumferentially spaced longitudinally extending key-receiving grooves 525 in tapered surface 516 arranged in a lock pattern to which a drive torque may be applied. In FIGS. 21-26, each lock pattern groove 525 is formed by a generally arcuate surface 527 extending radially outwards away from longitudinal axis x-x of fastener 502 from tapered surface 516 of drive portion 526. Surface 527 thereby intersects and forms an edge at its respective junction with tapered surface 516. In this embodiment, each of grooves 525 has an outer width 538 and an inner width 537 from one side of arcuate surface 527 to the other side.

Drive portion 526 has a total outer surface area consisting of the tapered surface area of tapered outer surface 516 and the groove cutaway surface area of grooves 525 in tapered outer surface 516. In this embodiment, this tapered surface area comprises at least about 59% of the total surface area. In order to impart lock pattern uniqueness, the lock pattern grooves 525 may be patterned in any suitable manner, such as by employing a selected number of grooves and/or by varying the spacing between grooves and/or the width, length or depth of the grooves.

A key (not shown) may be used to engage lock pattern grooves 525. The key includes a socket and a drive portion. The outer circumference of the socket is formed with a key pattern that may be implemented as a set of circumferentially arranged key pattern lobes. The key pattern lobes are configured and arranged to engage the lock pattern grooves 525 when the socket is placed into and properly aligned in cone portion 508. The internal drive portion of the key may be formed with a conventional hex (or other) configuration for engagement by a standard wrench or drive tool.

Figure 25:
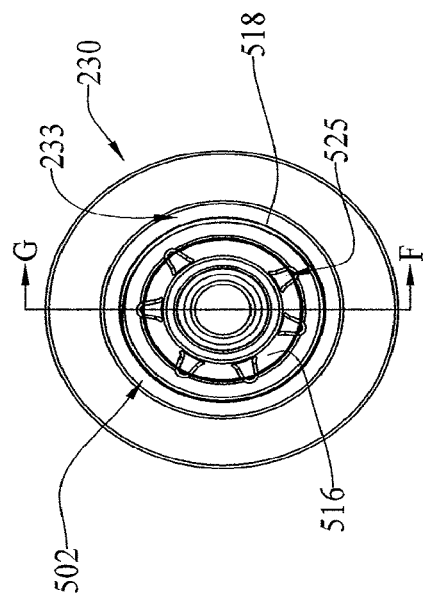
FIG. 25 is a front elevational view of the security fastener installation shown in FIG. 24.
Figure 24:
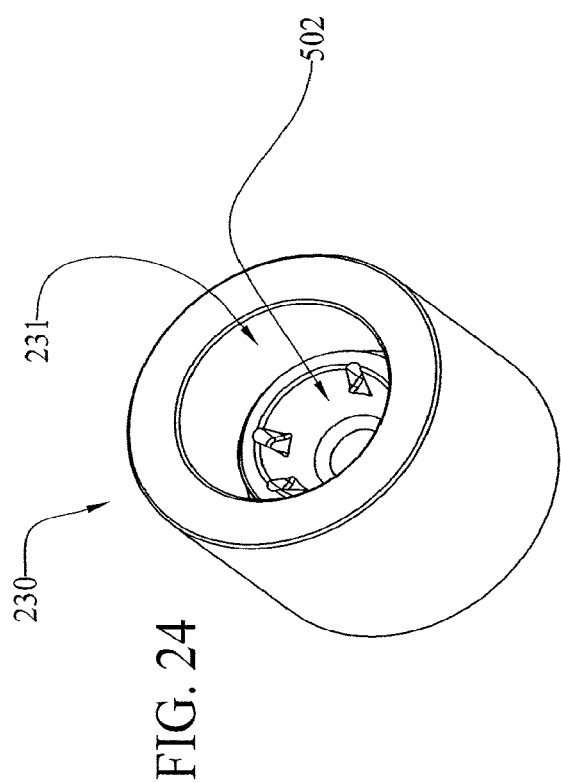
FIG. 24 is a perspective view of an example installation of the security fastener shown in FIG. 21.
Figure 26:
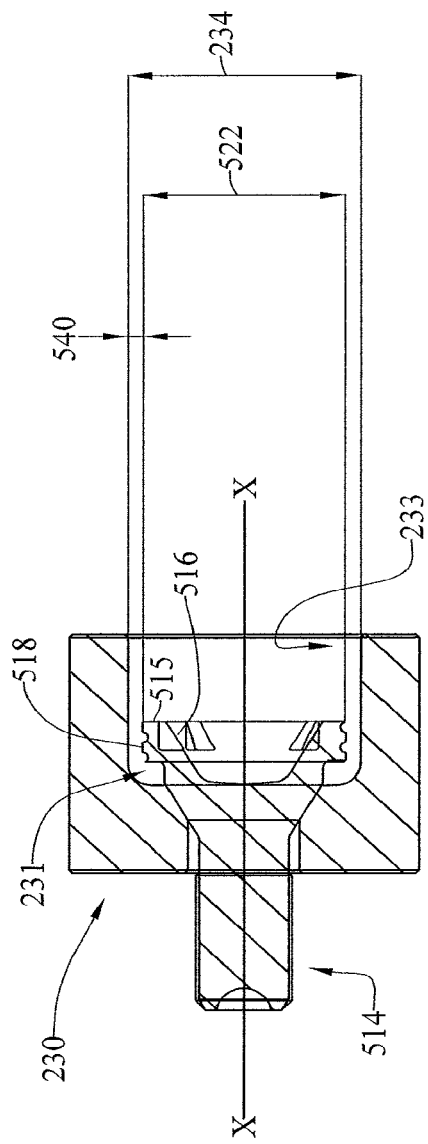
FIG. 26 is a longitudinal vertical cross-sectional view of the security fastener installation shown in FIG. 25, taken generally on line G-G of FIG. 25.

Turning now to FIGS. 24-26, an example installation is shown in which bolt fastener 502 is mounted on a wheel, represented at 230, that has at least one fastener-receiving recess hole 231. As shown, bolt fastener 502 is installed in recess hole 231, which in this embodiment is a relatively deep cylindrical well, having annular recess entrance 233 of diameter 234.

Cone portion 508 of bolt fastener 502 is arranged so that sidewall 518 thereof extends within recess hole 231. In this position, none of bolt fastener 502 is exposed outside recess hole entrance 234 and access to annular surface 518, which is not tapered in this embodiment relative to axis x-x, is limited by the imbedded position of fastener 502 in recess 231 and the circumferential gap 540 between outer diameter 522 of surface 518 and inner diameter 234 of recess entrance 233 of recess hole 231. The size of gap space 540 can be controlled by sizing diameter 522 according to diameter 234 of recess hole 231. In this way, cone portion 508 can be configured to provide a fastener security feature. In this embodiment, gap 540 is equal to or less than about 6 millimeters and more preferably is equal to or less than about 3 millimeters.

Figure 28:
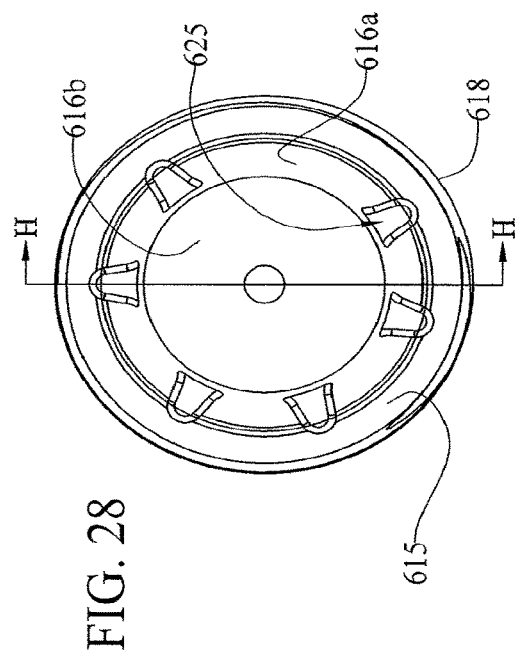
FIG. 28 is a front elevational view of the security fastener shown in FIG. 27.
Figure 27:
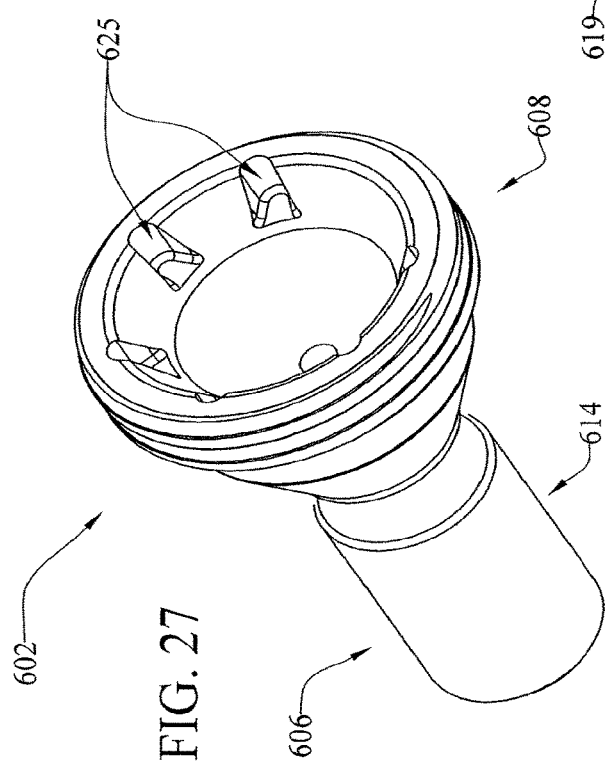
FIG. 27 is a perspective view of a seventh embodiment of an improved security fastener.
Figure 29:
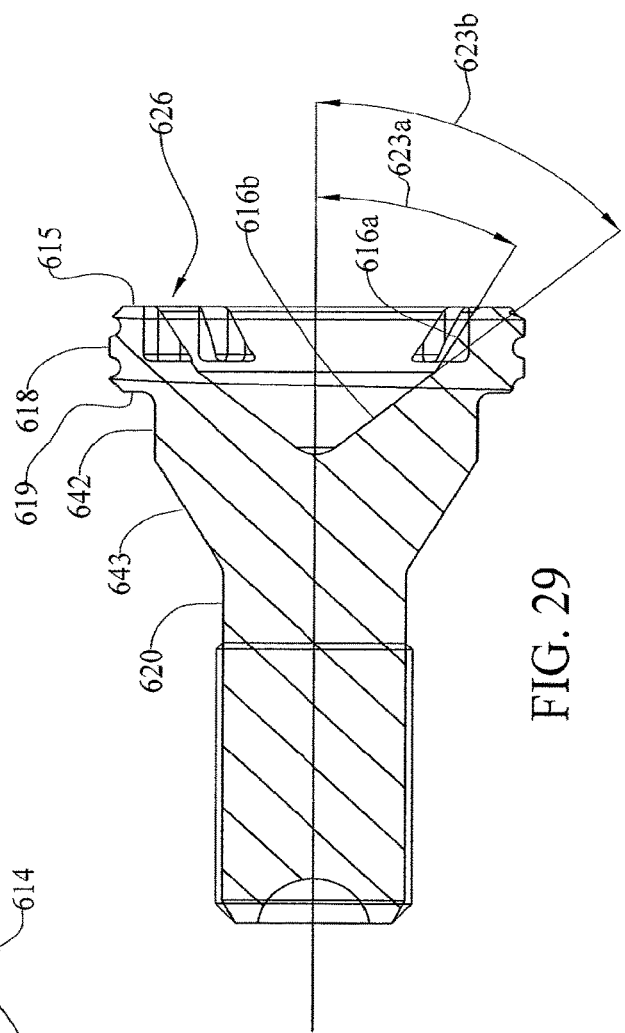
FIG. 29 is a longitudinal vertical cross-sectional view of the security fastener shown in FIG. 28, taken generally on line H-H of FIG. 28.

Turning now to FIGS. 27-29, a bolt-type security fastener 602 according to a seventh example embodiment is shown. Bolt fastener 602 has many of the features of bolt fastener 502 described above in connection with FIGS. 23-26. The major difference between bolt fastener 502 and bolt fastener 602 lies in the fact that drive portion 626 of bolt fastener 602 is formed with a double tapper.

In particular, and with reference to FIG. 29, cone portion 608 is a specially-configured solid member elongated along axis x-x, and is bounded by first rightwardly and inwardly-facing frusto-conical surface 616b, second rightwardly and inwardly-facing frusto-conical surface 616a, rightwardly-facing annular vertical surface 615, outwardly-facing horizontal cylindrical surface 618, leftwardly-facing annular vertical surface 619, outwardly-facing horizontal cylindrical surface 642, and leftwardly and outwardly-facing frusto-conical surface 643, joined at its inner marginal end to the right marginal end of outwardly-facing horizontal cylindrical surface 620 of shank 614.

In this embodiment, surface 616a is tapered or sloped downward or leftward from top surface 615 and inward toward longitudinal axis x-x at a tapered angle 623a from axis x-x of less than about 40 degrees. In this embodiment, tapered angle 623a is about 30 degrees. Surface 616b is tapered or sloped downward or leftward from first tapered surface 616a and inward toward longitudinal axis x-x at a tapered angle from axis x-x 623b at least about 40 degrees. In this embodiment, tapered angle 623b is about 50 degrees. As with bolt fastener 502, frusto-conical surfaces 616a and 616b provide an inner tapered or sloped surface that services as a security feature in that it is difficult to grip using an unauthorized tool. Should an attempt be made to rotate bolt fastener 602 by griping on surfaces 616a and/or 616b using an unauthorized tool, such tool will tend to slide on tapered surfaces 616a and 616b and it will tend to be difficult to find an attack point on bolt fastener 602.

As shown and described with respect to fastener 502, drive portion 626 has a key-receiving pattern that may be implemented as a set of circumferentially spaced longitudinally extending key-receiving grooves 625 in tapered surface 616a arranged in a lock pattern to which a drive torque may be applied, in the same manner as the lock pattern grooves 525 of bolt fastener 502 described above.

Accordingly, various security fasteners for installation on wheels having a recess hole have been disclosed. Although example embodiments have been shown and described, it should be apparent that many variations and alternative embodiments could be implemented in accordance with the teachings herein. It is understood, therefore, that the invention is not to be in any way limited except in accordance with the spirit of the appended claims and their equivalents.

What is claimed is:

1. A security fastener for installation on a wheel having a recess hole extending from a recess entrance of a first diameter, comprising:
    a threaded portion concentric with a longitudinal axis of said fastener;
    said threaded portion configured and arranged to mate with a corresponding threaded element of said recess hole of said wheel when said fastener is installed in said recess hole;
    an outer sidewall region concentric with said longitudinal axis of said fastener and configured and arranged such that said side wall region will extend within said recess hole when said fastener is installed in said recess hole;
    said side wall region having an outer diameter within about 6 millimeters of said first diameter of said recess entrance;
    a drive portion having a tapered inner surface and a plurality of circumferentially spaced longitudinally extending key-receiving grooves in said tapered inner surface arranged in a lock pattern to which a driving torque may be applied;
    said drive portion configured and arranged such that said lock pattern will be exposed outside, at or inside said entrance to said recess hole when said fastener is installed in said recess hole;
    said tapered inner surface sloping downward and inward toward said longitudinal axis of said fastener at a taper angle from said longitudinal axis of at least 11 degrees;
    said tapered inner surface having a Rockwell C scale hardness of about HRc 60 or less; and
    said taper angle of said tapered inner surface being greater than or equal to 11.25+((60−said Rockwell C scale hardness of said tapered inner surface)*.75).

2. The fastener of claim 1, wherein said taper angle of said tapered inner surface is between about 29 degrees and about 61 degrees.

3. The fastener of claim 1, wherein said tapered inner surface comprises a first tapered surface portion sloping downward and inward toward said longitudinal axis of said fastener at a first taper angle of at least 11 degrees and a second tapered surface portion sloping downward and inward toward said longitudinal axis of said fastener at a second taper angle that is greater than said first taper angle.

4. The fastener of claim 3, wherein said first taper angle is about 20 degrees and said second taper angle is about 45 degrees.

5. The fastener of claim 1, wherein each of said longitudinally extending key-receiving grooves is defined by an arcuate surface extending radially outward from said longitudinal axis of said fastener from said tapered surface of said drive portion.

6. The fastener of claim 5, wherein said tapered inner surface comprises a frusto-conical surface having an upper major diameter.

7. The fastener of claim 6, wherein said drive portion has a total inner surface area consisting of a tapered surface area of said tapered inner surface and a groove cutaway surface area of said grooves in said tapered inner surface and wherein said tapered surface area comprises at least about 59% of said total surface area.

\* \* \* \* \*